A. JOHNSTON.
ANIMAL TRAP.
APPLICATION FILED JAN. 6, 1913.
1,083,282.
Patented Jan. 6, 1914.
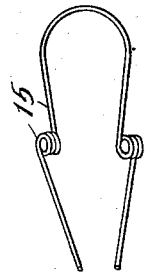
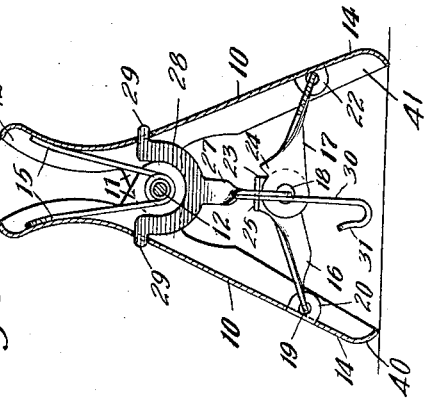
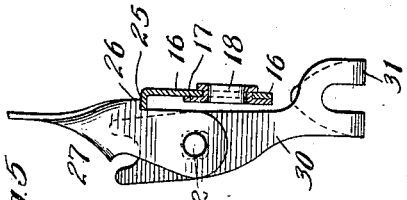
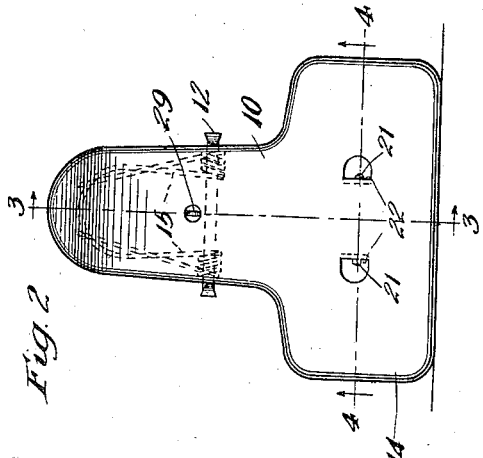
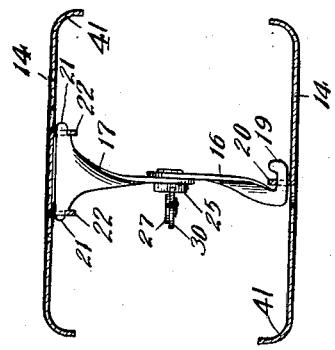
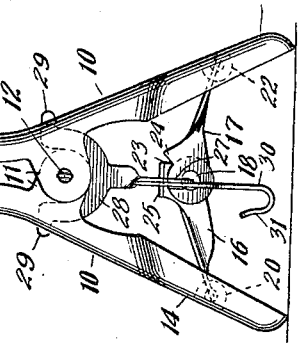
Witnesses:
Wm. Geiger
Pearl Abrams
Inventor:
Allen Johnston
By Munday, Evarts, Adcock & Clarke,
his Attys.

UNITED STATES PATENT OFFICE.

ALLEN JOHNSTON, OF OTTUMWA, IOWA, ASSIGNOR TO JOHNSTON & SHARP MANUFACTURING COMPANY, OF OTTUMWA, IOWA, A CORPORATION OF IOWA.

ANIMAL-TRAP.

1,083,282.   Specification of Letters Patent.   Patented Jan. 6, 1914.

Application filed January 6, 1913. Serial No. 740,295.

*To all whom it may concern:*

Be it known that I, ALLEN JOHNSTON, a citizen of the United States, residing in Ottumwa, in the county of Wapello and State of Iowa, have invented a new and useful Improvement in Animal-Traps, of which the following is a specification.

This invention relates to improvements in animal traps.

An object of the invention is to provide an animal trap suitable for household use, which can be easily set without danger or fear of injury, by merely compressing the parts of the trap forming the handle.

Another object of the invention is to provide an animal trap in which the detent and bait holder fall to position, in setting the trap, by gravity.

Still further objects of the invention are to provide an animal trap composed of few parts, most of which may be made from stamped sheet metal.

The invention furthermore consists in the improvement in the parts and devices herein shown, described or claimed.

In the drawing forming a part of this specification, Figure 1 is an end elevation of an animal trap embodying my improvements. Fig. 2 is a side elevation of the structure shown in Fig. 1. Fig. 3 is a vertical, sectional view taken substantially on the line 3—3 of Fig. 2. Fig. 4 is a partial horizontal, sectional view taken on the line 4—4 of Fig. 2, some of the lines being omitted in order to prevent confusion. Fig. 5 is an enlarged detail view showing more particularly the detent, bait holder and parts of the toggle, and Fig. 6 is a perspective view of the spring employed in closing the jaw members of the trap.

In said drawings, the trap, as shown, comprises two members 10, 10, formed by stamping up pieces of sheet metal, said members being provided with inwardly extending lugs 11 pivoted together as by means of a pivot pin 12. Each member 10 above the pivot pin 12 is formed in a handle portion 13 and below the pivot pin with a jaw portion 14, the latter being formed rectangular and more or less dish shaped, as shown more clearly in Figs. 2 and 4. As clearly shown in the drawing, the members 10, 10 are flanged at the bottom and side edges, as shown at 40 and 41, respectively, which flanges meet when the jaws are closed and provide sufficient space for inclosing the trigger and mechanism for setting the jaws, said flanges also serving to strengthen the otherwise relatively weak sheet metal parts. The members 10 are also provided with inwardly turned flanges 42 for the handle portions thereof, which flanges provide the necessary rigidity to prevent bending of the handles while the trap is being set. The jaws 14 are normally forced toward each other by means of a wire spring 15 having a portion thereof coiled about the pivot pin 12 and end portions engaging the handles 13.

Means are provided for setting the trap or holding the jaws open against the action of the spring 15, which means, as shown in the drawings, comprise a toggle formed of two members 16 and 17 pivotally connected to each other as at 18, and having their outer ends pivoted to the jaws 14. The toggle member 16 is pivotally connected to one of the jaws 14 by means of a right angle projection 19 engaging in a perforated lug 20 struck up from the metal forming the jaw, and the other toggle member 17 is pivotally connected to the other jaw 14 by means of oppositely extending projections 21 engaging in a pair of perforated lugs 22 struck up from the metal of the jaw, this latter form of pivotal connection serving to prevent the toggle members from twisting or getting out of proper position. The toggle members 16 and 17 are adapted to collapse or swing inwardly when the jaws 14 come together and when the jaws 14 are opened by compressing the handles 13, the toggle members 16 and 17 tend to approach a dead center condition but are prevented from reaching this position by means of stops in the form of interengaging shoulders 23 and 24 formed respectively on the members 16 and 17. The toggle member 16 is also provided with a turned up flange 25 with which is adapted to engage a shoulder 26 formed on a detent 27 pivotally connected to the members 10 by means of a U-shaped portion 28 having pivot-forming projections 29 engaging in suitable perforations in the members 10. As shown in the drawing, the detent 27 has pivoted thereto a bait holder 30 having a hooked end 31 to which may be attached cheese or other suitable substance for bait.

As will be noted, the detent 27 swings in a plane at right angles to the plane of movement of the toggle members 16 and 17 and the trap is set by merely compressing the handles 13 which tends to straighten the toggle, which movement is limited by the stops 23 and 24. When the toggle has been limited in its movements by the stops 23 and 24, the detent 27 will swing by gravity and the shoulder 26 thereon will engage the projection 25 on the toggle and hold the jaws open against the action of the spring 15. When a mouse or other animal attempts to eat the bait on the bait holder 30, the shoulder 26 will be disengaged from the projection 25 and the jaws 14 will snap together and impale the animal therebetween. In this connection it will also be noted that the jaws 14, being relatively elongated, will form an arch shaped passageway for the animal.

Although I have herein shown and described what I now consider the preferred embodiment of my invention, yet it will be understood that various changes and modifications may be made in the details of constructions and arrangement of parts without departing from the spirit of the invention, and all such changes and modifications are contemplated as come within the scope of the claims appended hereto.

I claim:—

1. An animal trap comprising, in combination: two members pivotally connected to each other, the portions of said members on one side of the pivot forming jaws and the portions on the other side of the pivot forming handles and so arranged that when the handle portions are compressed the jaws will be separated; a toggle having its ends pivotally connected to the jaws and movable toward dead-center position when the handles are compressed; a spring normally tending to force said jaws to closed position; means positively preventing said toggle from reaching dead-center position; and a pivoted detent adapted to operatively engage the toggle only when the jaws are spread apart and to prevent the same from collapsing, said detent being pivoted adjacent to the pivot connecting said members and freely swingable in a plane at right angles to the plane in which the toggle moves, substantially as specified.

2. An animal trap comprising, in combination: two members pivotally connected, the portions of said members to one side of the pivot forming handles and the portions on the other side of the pivot forming jaws and so arranged that when the handles are compressed the jaws will be separated; a toggle having its ends pivotally connected to the jaws and movable toward dead center position when the handles are compressed; interengaging stops on the members forming the toggle and adapted to prevent the toggle from reaching dead center position; a spring normally tending to force said jaws together and thereby collapse the toggle; a detent pivotally mounted on said members and adapted to engage said toggle and prevent the same from collapsing; and a bait holder pivotally attached to said detent, substantially as specified.

3. An animal trap comprising, in combination: two jaw members pivotally connected; a spring normally tending to force the jaws together; a toggle having the ends of its members pivotally connected to said jaw members; and a detent for holding the toggle, said detent comprising two members pivotally connected together, one of said members being pivoted to the jaw members and adapted to engage the toggle, and the other member acting as a lever to disengage the detent from the toggle, substantially as specified.

4. An animal trap comprising, in combination: two members pivotally connected together and having jaw-forming portions; a spring normally urging said jaw-forming portions together; and means for holding the jaw-forming portions apart against the action of said spring, said means including a toggle comprised of two twisted sheet metal parts, one of which is hinged to one of said members with a double bearing, and the other of which is hinged to the other of said members with a single bearing, substantially as specified.

ALLEN JOHNSTON.

Witnesses:
A. G. HARROW,
J. T. HACKWORTH.

Copies of this patent may be obtained for five cents each, by addressing the "Commissioner of Patents, Washington, D. C."